(12) United States Patent
Das

(10) Patent No.: US 10,666,658 B2
(45) Date of Patent: May 26, 2020

(54) TRUSTED NETWORK ENTITY SECURE CONNECTIVITY

(71) Applicant: NCR Corporation, Duluth, GA (US)

(72) Inventor: Sujoy Das, San Jose, CA (US)

(73) Assignee: NCR Corporation, Atlanta, GA (US)

( * ) Notice: Subject to any disclaimer, the term of this patent is extended or adjusted under 35 U.S.C. 154(b) by 374 days.

(21) Appl. No.: 15/420,034

(22) Filed: Jan. 30, 2017

(65) Prior Publication Data
US 2018/0219865 A1   Aug. 2, 2018

(51) Int. Cl.
  H04L 29/06   (2006.01)
  H04W 12/08   (2009.01)
  H04W 4/80    (2018.01)
  H04W 12/00   (2009.01)
  H04W 84/12   (2009.01)
  H04W 48/12   (2009.01)

(52) U.S. Cl.
  CPC .......... H04L 63/101 (2013.01); H04L 63/105 (2013.01); H04W 4/80 (2018.02); H04W 12/003 (2019.01); H04W 12/08 (2013.01); H04W 12/00503 (2019.01); H04W 48/12 (2013.01); H04W 84/12 (2013.01)

(58) Field of Classification Search
None
See application file for complete search history.

(56) References Cited

U.S. PATENT DOCUMENTS

| | | | | |
|---|---|---|---|---|
| 2008/0134281 A1* | 6/2008 | Shinde | ..................... | G06F 21/31 726/1 |
| 2008/0301779 A1* | 12/2008 | Garg | ..................... | H04L 63/101 726/4 |
| 2009/0019285 A1* | 1/2009 | Chen | ..................... | G06F 21/575 713/175 |
| 2011/0022839 A1* | 1/2011 | Hair | ..................... | H04L 63/0442 713/165 |
| 2011/0202992 A1* | 8/2011 | Xiao | ..................... | G06F 21/33 726/10 |
| 2014/0136633 A1* | 5/2014 | Murillo, Jr. | ............. | H04L 51/24 709/206 |
| 2016/0378996 A1* | 12/2016 | Smith | ................... | G06F 21/602 713/190 |
| 2016/0381079 A1* | 12/2016 | Ben-Shalom | ......... | H04L 63/105 726/29 |
| 2017/0041147 A1* | 2/2017 | Krahn | ................... | H04L 9/0897 |

* cited by examiner

*Primary Examiner* — Shin-Hon (Eric) Chen
(74) *Attorney, Agent, or Firm* — Schwegman, Lundberg & Woessner

(57) ABSTRACT

Various embodiments herein each include at least one of systems, methods, software, processes, and devices for trusted network entity secure connectivity. Some system and method embodiments include a network of trusted network entities, such as devices and processes, which unlock themselves and their services only when additional security checks are applied for any of the available radio devices and processes on the network in the vicinity. Such embodiments operate to provide an additional level of security to the trusted network entity communication and approval to unlock each other.

10 Claims, 4 Drawing Sheets

TRUSTED NETWORK ENTITY SECURE CONNECTIVITY

BACKGROUND INFORMATION

Currently, mechanisms are available through which previously connected network entities, such as WI-FI® and BLUETOOTH® peers, known as trusted devices can automatically unlock themselves and the services within when they get connected to each other. However, this can cause security issues should an undesirable third-party enter the vicinity. Sensitive contents can be stolen in such a situation leading to compromised data and security and the many issues that can arise therefrom.

SUMMARY

Various embodiments herein each include at least one of systems, methods, software, processes, and devices for trusted network entity secure connectivity. Some system and method embodiments include a network of trusted network entities, such as devices and processes, which unlock themselves and their services only when additional security checks are applied for any of the available radio devices and processes on the network in the vicinity. Such embodiments operate to provide an additional level of security to the trusted network entity communication and approval to unlock each other.

One method embodiment includes maintaining, by a first network entity, a trusted network entities list of network entities to which the first network entity is authorized to connect. The method further includes scanning, by the first network entity, a network for network entities on the network and comparing each network entity with the trusted network entities list to ensure each network entity on the network is present on the trusted network entities list. When a second network entity is on the network and not present on the trusted network entities list, the method includes the first network entity transmitting second network entity information to other network entities included on the trusted network entities list.

Another method embodiment, when a first network entity is identified by a second network entity as being connected to a network and not present on a trusted network entities list, includes transmitting, by the second network entity, first network entity information to other network entities included on the trusted network entities list.

A further embodiment, in the form of a network entity, such as a network device, a radio device, or a process that executes on a network. The network entity of such embodiments includes a data store holding a trusted network entities list and a SUM including instructions executable to perform data processing activities. In some embodiments, the data processing activities, when a foreign network entity is identified by the SHM as being connected to a network and not present on the trusted network entities list, includes transmitting foreign network entity information to other network entities included on the trusted network entities list.

DETAILED DESCRIPTION

Figure 1:
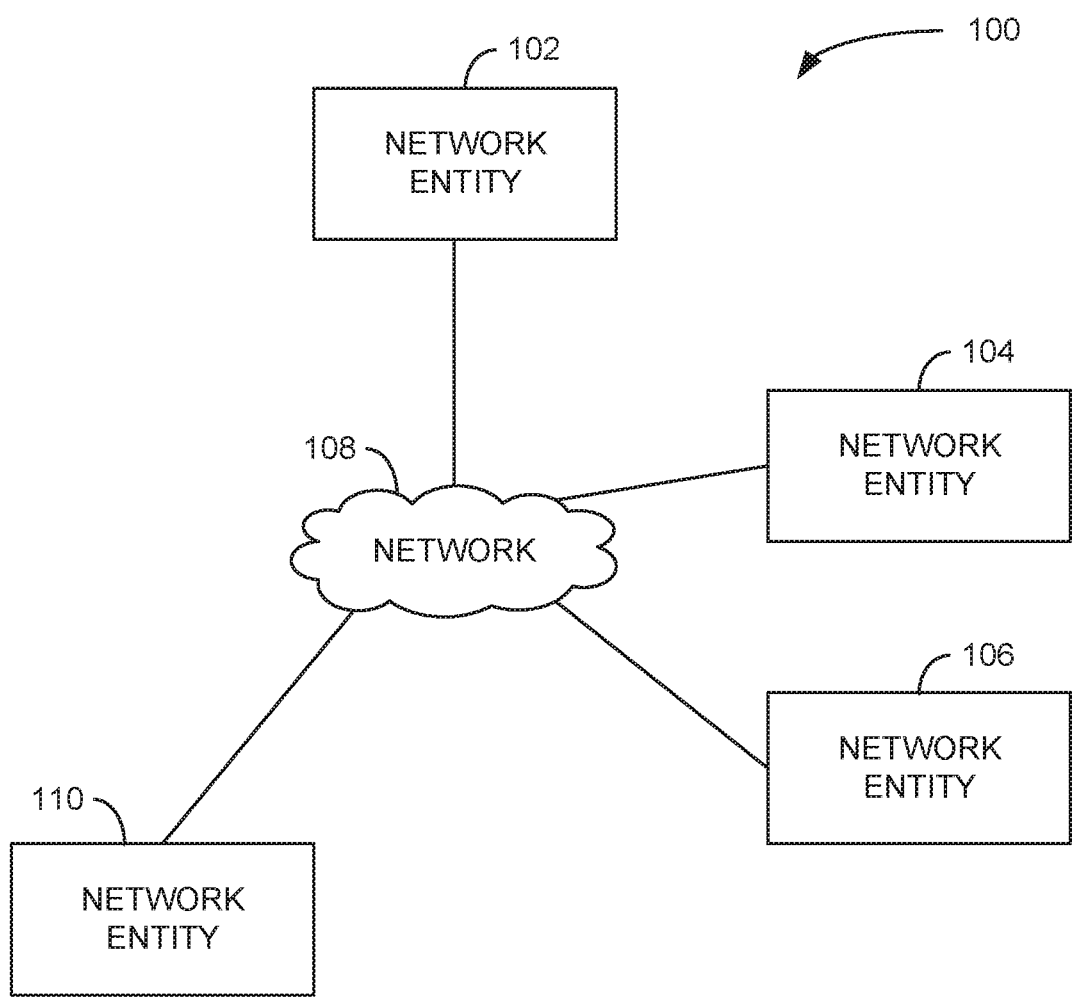
FIG. 1 is a logical block diagram of a network of trusted network entities, according to an example embodiment.

Various embodiments herein each include at least one of systems, methods, software, processes, and devices for trusted network entity secure connectivity. Some system and method embodiments include a network of trusted network entities, such as devices and processes, which unlock themselves and their services only when additional security checks are applied for any of the available radio devices and processes on the network in the vicinity. Such embodiments operate to provide an additional level of security to the trusted network entity communication and approval to unlock each other.

In some embodiments, a group of network entities who have been previously paired forms a trusted network. A scanner and handshaking module (SHM) is implemented, in hardware or software, on each of the trusted network entities. Each SHM scans and performs intelligent handshaking between the network entities.

The SHM, in some embodiments, scans and checks if any foreign network entities, such as additional radios are available in the vicinity or processes are executing on the network. In case, when any foreign network entity is present, the foreign network entity information is broadcasted only to the trusted network entities. In some embodiments, upon receiving the foreign network entity information, the trusted network entities individually check whether the foreign network entity has been previously paired. In a case where the foreign network entity is already paired to the receiving network entity, it will considered a positive call. Once this scanning and validation of the SHMs of each trusted network entity is done and all the foreign network entities, if any, have been validated as trusted, the trusted network entities can unlock themselves and their service accordingly.

In one embodiment, a data store is maintained in or by each of trusted network entities which has the list of flagged and peer-trusted network entities from all trusted sessions. Peer trusted network entities are those network entities which might not be paired with a particular trusted network entity, but which has been paired before with another trusted network entity.

In another embodiment, the SHM of at least some of the trusted network entities continually scans the environment whenever a trusted session between trusted network entities is active. At any point if a foreign network entity is discovered on the network and none of the trusted network entities has information about the foreign network entity or includes an entity on their trusted network entities list indicating the foreign network entity is explicitly not trusted, this is communicated with regard to the foreign network entity to all trusted network entities. The trusted network entities then automatically lock themselves. These now locked trusted network entities can later be unlocked by providing connection credentials, such as a general userid and password or other credentials.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a network 200 of trusted network entities, according to an example embodiment. The network 200 includes trusted network entities 102, 104, and 106. Each trusted network entity 102, 104, 106 includes an SHM. The SHM of each trusted network entity 102, 104, 106 maintains a list of other network entities to which they have previously connected over a data network 108. The members of this list are the trusted network entities. The list of each trusted network entity 102, 104, 106 may be altered in some embodiments by a user or administrator, either directly or through configuration and maintenance processes, and during by operation of the SHMs.

The trusted network entities 102, 104, 106 may be hardware devices, such as network interface devices (e.g., Ethernet, WI-FI®), or other devices that operate according to a defined standards-based short-range radio network with devices having a range of up to approximately 100 meters, such as a BLUETOOTH® device). The trusted network entities may also be software processes that listen on the network 108 amongst the network 200 of trusted network entities 102, 104, 106 for foreign network entities, such as foreign network entity 110. The SHMs may therefore be hardware, software, or a combination thereof. Further, while one network entity 102, 104, 106 may have a hardware SHM, another network entity 102, 104, 106 may have a software SHM.

Foreign network entity 110 may also be a hardware device or software process. In the illustration of the network 200 of FIG. 2, the foreign network entity 110 somehow came into communication over the network 108. The network 108 may be a physical data network but may also be an ad hoc peer-to-peer network, such as may be created by a cluster of BLUETOOTH® devices. The SHMs of the trusted network entities 102, 104, 106 listen on the network for communication by network entities that are not trusted. Untrusted network entities may be any network entity that is not included on a list of trusted network entities of a particular trusted network entity. Some such lists may be also include explicitly not trusted network entities. Regardless, when an SHM identifies communication from a network entity that is not trusted, the SHM will query the SHMs of the other trusted network entities 102, 104, 106 with available information about the foreign network entity 110 to find out if any of the other network entities 102, 104, 106 trust the foreign network entity 110. An SHM that knows the foreign network entity 110 will then transmit data all of the other trusted network entities indicating the foreign network entity 110 is trusted and each will update their trusted network entities list. However, if none of the trusted network entities 102, 104, 106 reply or if one of the SHMs replies as explicitly not trusting the foreign network entity 110, each of the SHMs will lock themselves to prevent any unauthorized interactions and to prevent the foreign network entity 110 from intercepting any data on the network 108. To reestablish the network 108, the trusted network entities 102, 104, 106 must re-authenticate, such as by providing logon credentials, waiting for a timeout period, receipt of an administrator authorization or intervention, and the like.

Figure 2:
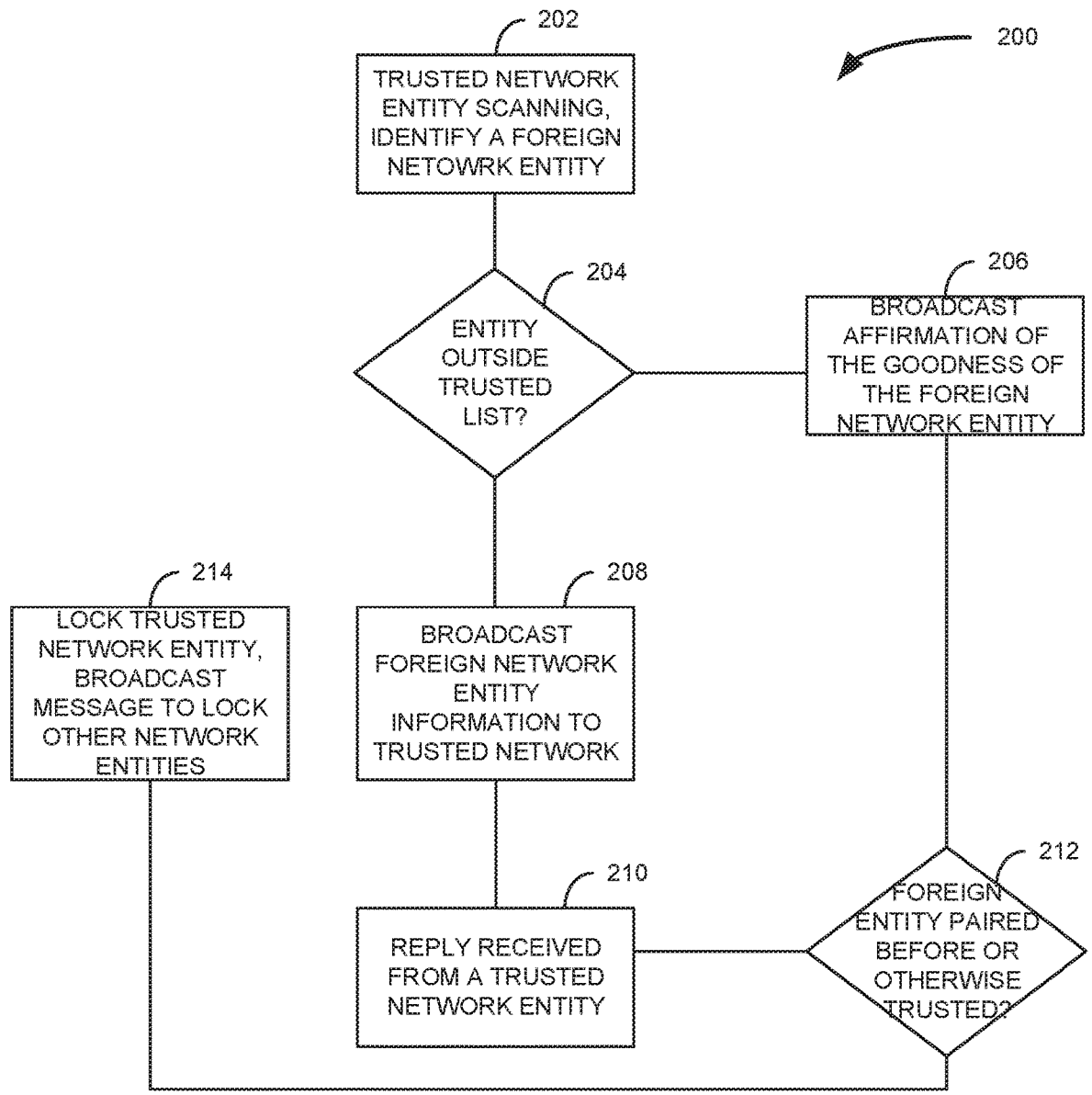
FIG. 2 is a logical block diagram of a method, according to an example embodiment.

FIG. 2 is a logical block diagram of a method 200, according to an example embodiment. The method 200 is an example of a method that may be performed with regard to trusted network entities 102, 104, 106 and foreign network entity 110 of FIG. 1. The method 200 includes a trusted device, such as trusted network entity 102, scanning 202 for radio frequencies or other data on the network 108 of FIG. 1 and determining 204 if there are any devices or processes outside of the trusted network as known to the scanning network entity 102. When there are not, the SHM module of the trusted network entity 102 performing the scanning 202 and determining 204 may send 206 a broadcast to the trusted network entities affirming the goodness of the current state of the network when there are no foreign network entities or any foreign network entities are known to the scanning 202 network entity and start a timer for a next scan, when the scanning 202 is time-initiated.

However, when it was determined 204 that there is a foreign network entity present and the scanning 202 trusted network entity 102 is not aware of the foreign network entity (e.g., 110), the method 200 may include the SHM of the scanning 202 trusted network entity 102 broadcasting 208 data of the foreign network entity to the other trusted network entities (e.g., 104, 106) and receiving a reply 210 broadcast from a trusted network entity. The scanning 202 trusted network entity 102 may then determine 212 whether the received reply 210 indicates the foreign network entity is trusted based on a previous connection or otherwise. When the foreign network entity is trusted, the method 200 may add the foreign network entity to the trusted network entities list, send 206 a broadcast to the trusted network entities affirming the goodness of the current state of the network, and start a timer for a next scan, when the scanning 202 is time-initiated. Otherwise, when the foreign network entity is not trusted, the SHM of the scanning 202 network entity 102 will lock 214 itself and broadcast a message to each of the SHMs to lock themselves to prevent any unauthorized interactions and to prevent the foreign network entity 110 from intercepting any data on the network 108. To reestablish the network 108, the trusted network entities 102, 104, 106 must re-authenticate, such as by providing logon credentials, waiting for a timeout period, receipt of an administrator authorization or intervention, and the like.

Figure 3:
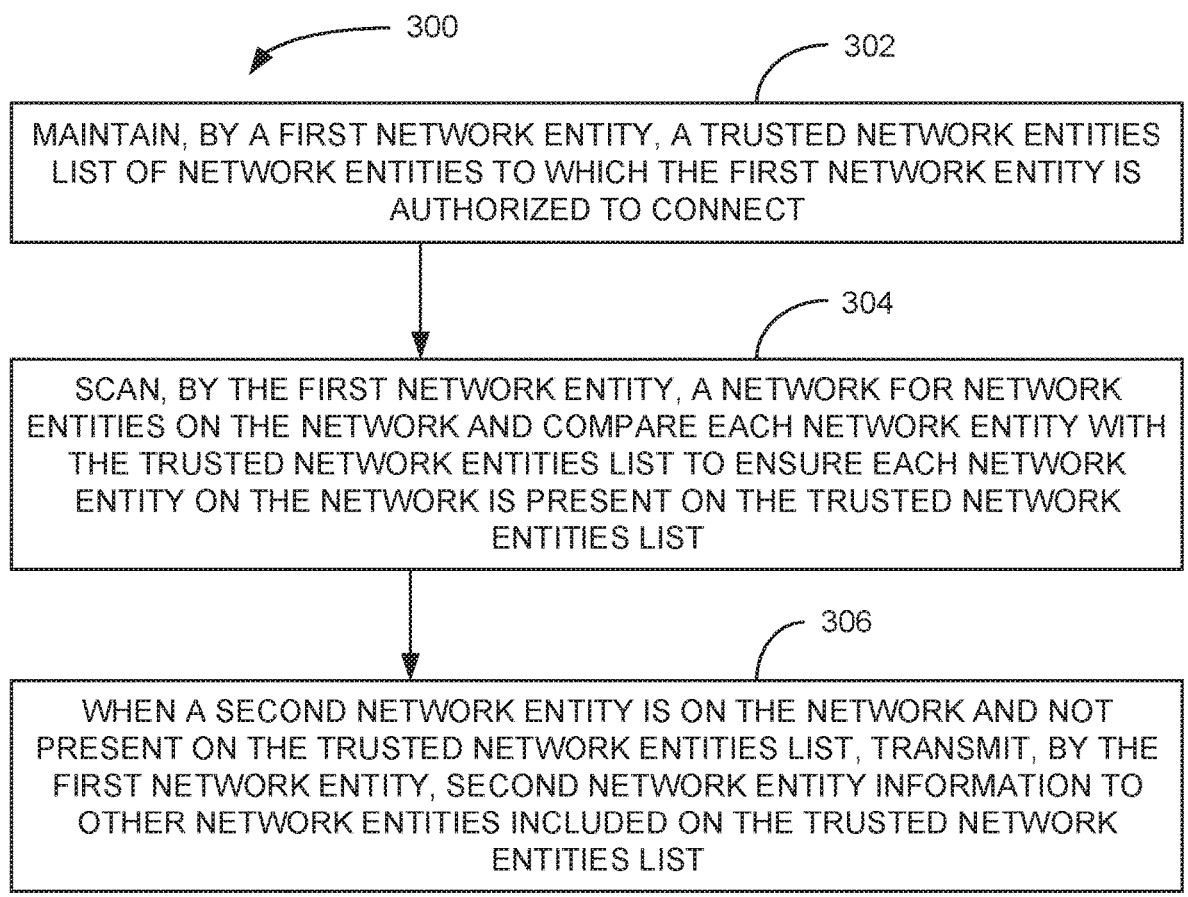
FIG. 3 is a logical block diagram of a method, according to an example embodiment.

FIG. 3 is a logical block diagram of a method 300, according to an example embodiment. The method 300 is an example of a method that may be performed by an SHM of a network entity. The method 300 includes maintaining 302, by a first network entity, a trusted network entities list of network entities to which the first network entity is authorized to connect. The method 300 further includes the first network entity scanning 304 a network for network entities on the network and comparing each network entity with the trusted network entities list to ensure each network entity on the network is present on the trusted network entities list. In such embodiments, when a second network entity is on the network and not present on the trusted network entities list, the method 300 includes transmitting 306, by the first network entity, second network entity information to other network entities included on the trusted network entities list. Some embodiments of the method 300 further include adding the second network entity to the trusted network entities list when a reply is received from a third network entity indicating the second network entity is trusted. Such further embodiments may also include locking the first network entity and transmitting a lock message to other network entities included on the network entities list when a not-trusted reply is received or no reply is received.

In some embodiments of the method 300, the method 300 may also include locking the first network entity and transmitting a lock message to other network entities included on the network entities list when a not-trusted reply is received or no reply is received.

Figure 4:
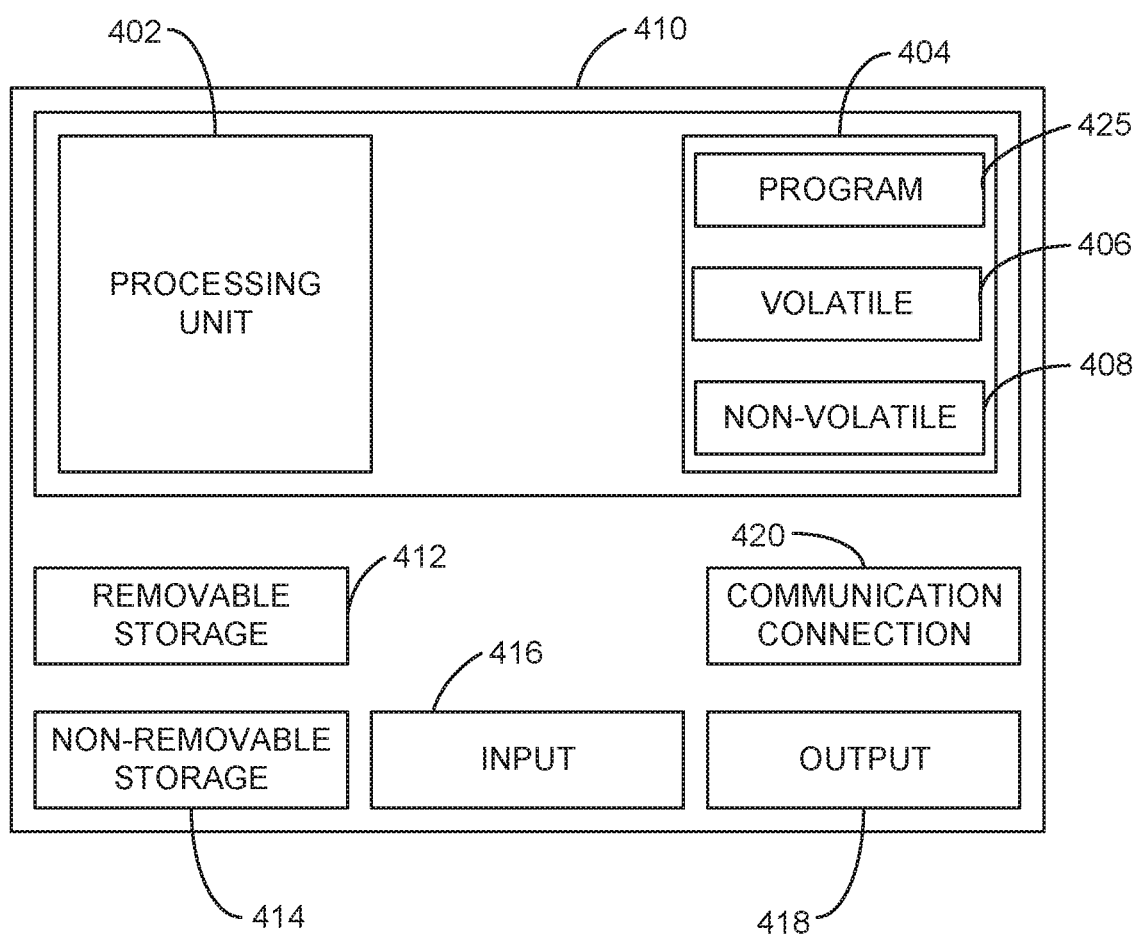
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Although the example computing device is illustrated and described as computer 410, the computing device may be in different forms in different embodiments. For example, the computing device may instead be a smartphone, a tablet, smartwatch, or other computing device including the same or similar elements as illustrated and described with regard to FIG. 4. Devices such as smartphones, tablets, and smart watches are generally collectively referred to as mobile devices. Further, although the various data storage elements are illustrated as part of the computer 410, the storage may also or alternatively include cloud-based storage accessible via a network, such as the Internet.

Returning to the computer 410, memory 404 may include volatile memory 406 and non-volatile memory 408. Computer 410 may include—or have access to a computing environment that includes a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 410 may include or have access to a computing environment that includes input 416, output 418, and a communication connection 420. The input 416 may include one or more of a touchscreen, touchpad, mouse, keyboard, camera, one or more device-specific buttons, one or more sensors integrated within or coupled via wired or wireless data connections to the computer 410, and other input devices. The computer 410 may operate in a networked environment using a communication connection 420 to connect to one or more remote computers, such as database servers, web servers, and other computing device. An example remote computer may include a personal computer (PC), server, router, network PC, a peer device or other common network node, or the like. The communication connection 420 may be a network interface device, which may be a network entity or include a hardware or software element of a network entity as described elsewhere herein, such as one or both of an Ethernet card and a wireless card or circuit that may be connected to a network. The network may include one or more of a Local Area Network (LAN), a Wide Area Network (WAN), the Internet, and other networks. In some embodiments, the communication connection 420 may also or alternatively include a transceiver device, such as a BLUETOOTH® device that enables the computer 410 to wirelessly receive data from and transmit data to other BLUETOOTH® devices.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs 425 or apps, such as one or more applications and modules implementing one or more of the methods illustrated and described herein or an app or application that executes on a mobile device or is accessible via a web browser, may be stored on a non-transitory computer-readable medium. Such computer programs 425, apps, and elements thereof may themselves be network entities as also described elsewhere herein.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
    maintaining, by a first network entity, a trusted network entities list of network entities to which the first network entity is authorized to connect;
    scanning, by the first network entity, a network for all network entities on the network and comparing each network entity with the trusted network entities list to ensure each network entity on the network is present on the trusted network entities list;
    identifying a second network entity is on the network and not present on the trusted network entities list; and
    transmitting, by the first network entity, second network entity information to other network entities included on the trusted network entities list;
    receiving from at least one of the other network entities a communication of data indicating that the at least one of the other network entities has previously paired with the second network entity;

updating the trusted network entities list with the second network entity information to identify the second network entity as a new trusted network entity;

adding the second network entity to the trusted network entities list when a reply is received from network entity indicating the second network entity is trusted; and locking the first network entity and transmitting a lock message to other network entities included on the network entities list when a not-trusted reply is received or no reply is received.

2. The method of claim 1, further comprising: locking the first network entity and transmitting a lock message to other network entities included on the network entities list when a not-trusted reply is received or no reply is received.

3. The method of claim 1, wherein at least one network entity included on the trusted network entities list is a hardware device.

4. The method of claim 1, wherein at least one network entity included on the trusted network entities list is a software process.

5. The method of claim 1, wherein the network is a wireless local area network.

6. The method of claim 1, wherein the network is a network of devices that operate according the network according to a defined standards short-range radio network with devices having a range of up to approximately 100 meters.

7. A network entity comprising:
a network interface device;
a data store holding a trusted network entities list; and
a scanner-handshake module including instructions executable to perform data processing activities comprising:
identifying a foreign network entity by the scanner-handshake module as being connected to a network and not present on the trusted network entities list;

transmitting foreign network entity information to other network entities included on the trusted network entities list;

receiving from at least one of the other network entities a response indicating that the at least one of the other network entities has previously paired with the foreign network entity;

updating the trusted network entities list with the foreign network entity information to identify the foreign network entity as a new trusted network entity;

adding the foreign network entity to the trusted network entities list when a reply is received from a trusted network entity indicating the foreign network entity is trusted; and when a not-trusted reply is received or no reply is received, locking the network entity and transmitting a lock message to the trusted network entities included on the trusted network entities list;

wherein the network entity is a hardware device and the scanner-handshake module is a platform level service of the hardware device.

8. The network entity of claim 7, further comprising:
wherein the foreign network entity is identified by receipt of data by the network entity from the foreign network entity via the network interface device; and the transmitting of the foreign network entity information to other network entities included on the trusted network entities list is performed by transmitting data to the other network entities via the network interface device.

9. The network entity of claim 8, wherein the network interface device operates according to a defined standards-based short-range radio network with devices having a range of up to approximately 100 meters.

10. The network entity of claim 7, wherein the scanner-handshake module is a software portion of a software process that executes on a processor of a computing device.

* * * * *